United States Patent
Schulz et al.

(10) Patent No.: US 9,090,220 B2
(45) Date of Patent: Jul. 28, 2015

(54) SEAT BELT

(75) Inventors: Edelgard Schulz, Hochheim (DE); Johannes Diehl, Saulheim (DE)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 115 days.

(21) Appl. No.: 13/218,535

(22) Filed: Aug. 26, 2011

(65) Prior Publication Data

US 2012/0074738 A1     Mar. 29, 2012

(30) Foreign Application Priority Data

Aug. 28, 2010 (DE) .................. 10 2010 035 733

(51) Int. Cl.
  *B60R 22/00* (2006.01)
  *B60R 22/02* (2006.01)
(52) U.S. Cl.
  CPC ..................................... *B60R 22/02* (2013.01)
(58) Field of Classification Search
  USPC ................ 280/801.1, 806, 808; 297/468, 483
  See application file for complete search history.

(56) References Cited

U.S. PATENT DOCUMENTS

| | | | |
|---|---|---|---|
| 4,057,290 A * | 11/1977 | Arima | 297/481 |
| 4,420,172 A | 12/1983 | Kojima | |
| 5,957,499 A * | 9/1999 | Kempf | 280/801.1 |
| 2003/0173767 A1 | 9/2003 | Kobayashi | |
| 2005/0104436 A1 | 5/2005 | Bell et al. | |

FOREIGN PATENT DOCUMENTS

| | | |
|---|---|---|
| DE | 19642689 C1 | 11/1997 |
| DE | 10337018 A1 | 3/2005 |
| DE | 102006012936 A1 | 9/2007 |
| DE | 202007014820 U1 | 1/2008 |
| FR | 2829449 A1 | 3/2003 |
| JP | 10006920 A | 1/1998 |
| JP | 10166996 A | 6/1998 |

* cited by examiner

*Primary Examiner* — Faye M. Fleming
(74) *Attorney, Agent, or Firm* — Ingrassia Fisher & Lorenz, P.C.

(57) ABSTRACT

A seat belt is provided for the protection of vehicle occupants of an automobile against accidents that includes, but is not limited to a webbing for restraining the vehicle occupant, a locking tongue movably connected to the webbing in a longitudinal direction of the webbing for locking with a belt lock, and a textile retaining device connected immovably to the webbing, having an insertion opening for at least partial receipt of the locking tongue. The retaining device forms an outlet opening opposite the insertion opening. Since the region opposite the insertion opening is not closed, but open, the design structure of the retaining device can be simplified and a simpler fastening of the retaining device to the webbing can be achieved, so that the manufacture of the seat belt is simplified.

15 Claims, 1 Drawing Sheet

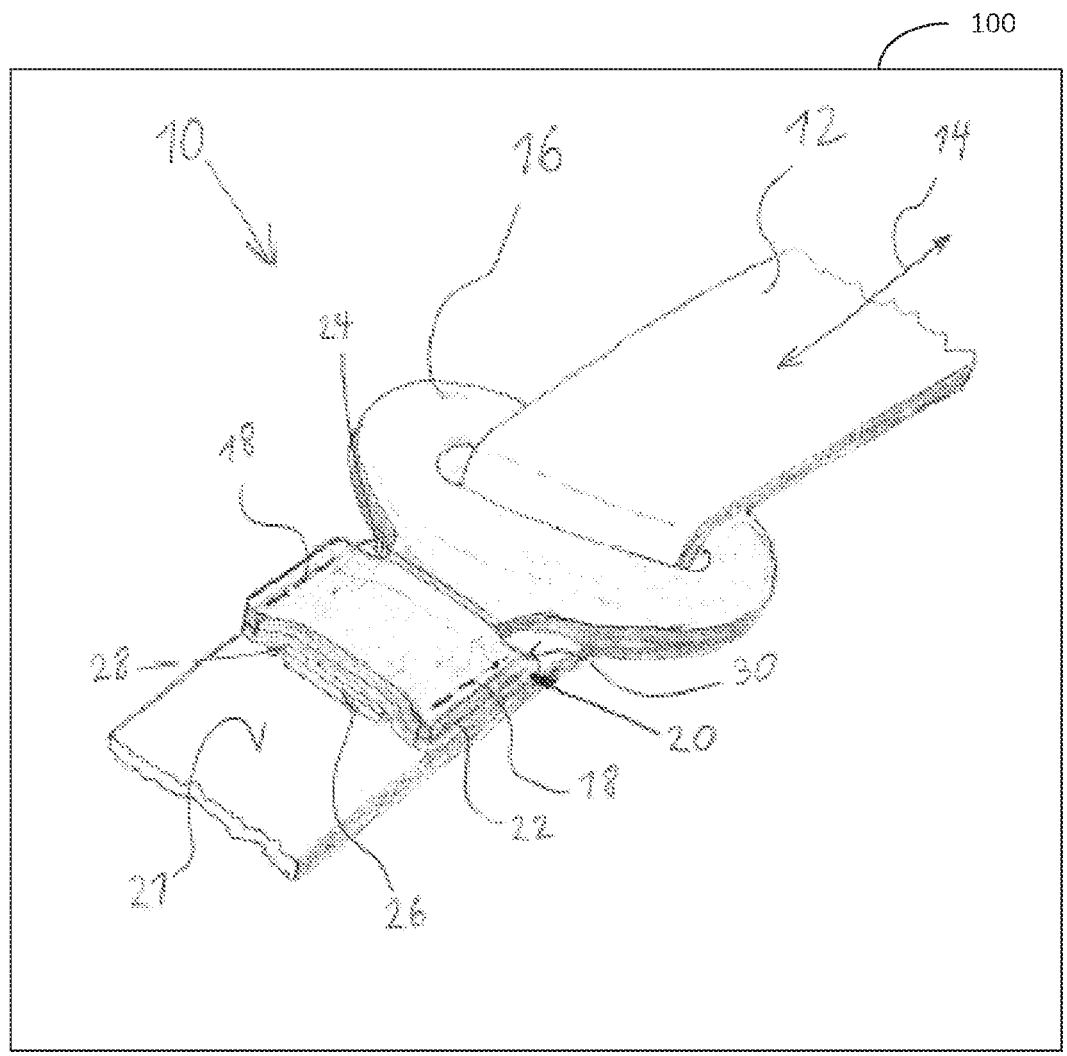

SEAT BELT

CROSS-REFERENCE TO RELATED APPLICATION

This application claims priority to German Patent Application No. 102010035733.2, filed Aug. 28, 2010, which is incorporated herein by reference in its entirety.

TECHNICAL FIELD

The technical field relates to a seat belt for protection of vehicle occupants of an automobile against accidents, with the aid of which the vehicle occupant belted up with the seat belt can be restrained in the event of a crash in order to avoid injuries to the vehicle occupant.

BACKGROUND

Known from DE 10 2006 012 936 A1 and DE 196 42 689 C1 is a seat belt comprising a textile strap material connected to a webbing, the strap material forming a pocket closed on three sides, into which a locking tongue movably connected to the webbing can be inserted via an insertion opening. There is a need to simplify the manufacture and/or the handling of a seat belt.

Therefore, it is at least one object to provide a seat belt whose manufacture and/or handling is simplified. In addition, other objects, desirable features and characteristics will become apparent from the subsequent summary and detailed description, and the appended claims, taken in conjunction with the accompanying drawings and this background.

SUMMARY

A seat belt for the protection of vehicle occupants of an automobile against accidents comprises a webbing for restraining the vehicle occupant, a locking tongue movably connected to the webbing in a longitudinal direction of the webbing for locking with a belt lock, and a textile retaining device immovably connected to the webbing, having an insertion opening for at least partial receipt of the locking tongue, wherein the retaining device forms an outlet opening opposite the insertion opening.

Since the region opposite the insertion opening is not closed, but open, the design structure of the retaining device can be simplified and a simpler fastening of the retaining device to the webbing can be achieved, so that the manufacture of the seat belt is simplified. In particular, compared to a pocket closed on three sides, due to the outlet opening it can be avoided that, contaminants and other particles can collect in the retaining device and impair the locking function of the locking tongue. For example, it can be avoided that felt fibers unintentionally pulled out from the retaining device by the locking tongue collect and render difficult or thwart the engagement of a locking means of a belt lock in the locking tongue. The accident protection function of the seat belt is as a result more robust toward contaminants. Furthermore, an accumulation of air can be avoided when inserting the locking tongue into the retaining device so that a resistance to insertion of the locking tongue into the retaining device can be reduced and/or frictional forces can be increased for holding the belt tongue in the retaining device. Due to the textile form of the retaining device, the retaining device can nestle against the shape of the locking tongue and bring about a flat contact which avoids any unintentional slippage of the locking tongue from the retaining device. In particular, with the aid of the retaining device, a locking tongue designed to be straight can be positioned in a pleasantly tidied state substantially parallel to the webbing so that the locking tongue does not protrude from the webbing and project into the vehicle interior of the automobile.

In particular, the retaining device comprises a strap material which is folded over in a double layer to form a foldover edge, wherein the foldover edge is oppositely directed to the direction of insertion of the locking tongue in the retaining device. It is also possible to form more than two layers. Due to the foldover edge of the strap material, a substantially rounded edge is obtained, which facilitates the threading of the locking tongue into the retaining device. Furthermore, sharp-edged edges are avoided so that a vehicle occupant who wished to insert the locking tongue into the retaining device does not cut himself on an edge but merely comes upon the surface of the strap material in the region of the rounded bent foldover edge. This facilitates the handling and leads to a haptically pleasing shape, which improves the acceptance of a safety system in the form of a seat belt by the vehicle occupants.

The double-layer region of the strap material preferably runs over a large proportion of the extension of the retaining device in the longitudinal direction of the webbing, in particular substantially over the entire extension of the retaining device in the longitudinal direction of the webbing. As a result, a comparatively extensive contact surface can be achieved between the strap material of the retaining device and the locking tongue. Also in the case of a comparatively small normal force exerted by the retaining device on the locking tongue, a sufficiently large frictional force can be provided over the enlarged contact surface, which prevents any undesired slippage of the locking tongue from the retaining device. In particular, the entire extension of the retaining device in the longitudinal direction of the webbing can be used free from interruption as a contact surface for the locking tongue.

In particular, the double-layer region of the strap material runs over a large proportion of the extension of the retaining device transverse to the longitudinal direction of the webbing, in particular substantially over the entire extension of the retaining device transverse to the longitudinal direction of the webbing. As a result, the contact surface of the strap material of the retaining device on the locking tongue can also be maximized transverse to the longitudinal direction.

Particularly preferably in the inserted state of the locking tongue in the retaining device, the locking tongue nestles both against the webbing and also against the strap material. The locking tongue can thereby nestle flat against the webbing. As a result, the material of the webbing is also used for holding the locking tongue in the retaining device so that correspondingly less material is required for the retaining device. In particular it is not necessary for the retaining device with the strap material to form a closed loop since a part of this loop can be formed by the webbing itself.

In particular, the retaining device is connected to the webbing on only one upper side of the webbing. It is not necessary for the retaining device, in particular a textile strap material of the retaining device, to laterally embrace the webbing and be positioned on the upper side pointing away from the locking tongue. The material expenditure for the retaining device can thereby be reduced.

In an embodiment, the retaining device is connected to the webbing via only two fastening points running in the longitudinal direction. Since the retaining device forms both an insertion opening and an outlet opening, both openings can be provided by merely interconnecting the lateral ends of the openings via the fastening points running in the longitudinal direction. As a result, substantially the same size openings are automatically obtained for the insertion opening and the outlet opening. In particular, crossing fastening paths for the fastening of the retaining device to the webbing, which can only be carried out sequentially, can be avoided. Instead, it is possible to make all the fastening points simultaneously so that manufacture can be simplified and accelerated.

The retaining device is preferably sewn to the webbing at the fastening points by means of fastening seams. As a result of the textile character of the webbing and the retaining device, a secure and firm connection can be made by sewing. The webbing and the retaining device are preferably made of a comparable, in particular identical, textile strap material.

In particular, the retaining device is a separate part to the webbing. The retaining device is thereby not made in one piece with the webbing. This makes it easier to manufacture the webbing from a continuous material without providing material for forming the retaining device at defined intervals. Furthermore, it is not necessary to return one end of the webbing in the longitudinal direction to form a loop in order to form the retaining device. An unnecessary consumption of webbing material is thereby avoided so that the material costs for the seat belt can be lowered.

In a further embodiment, an automobile seat is provided, in particular for a third row of seats of a passenger car, for example, SUV or VAN, comprising a seat portion and a seat rest pivotably connected to the seat portion, wherein the seat rest is pivotable from an upright position via a pivoting region until it rests flat on a seat surface of the seat portion, wherein a seat belt is disposed between the seat portion and the seat rest in the pivoting region of the seat rest, wherein the seat belt can be configured and further developed as described previously.

Since the region of the retaining device of the seat belt opposite the insertion opening is not closed, but open, the design structure of the retaining device can be simplified and a simpler fastening of the retaining device to the webbing can be achieved, so that the manufacture of the automobile seat is simplified. At the same time, it can be avoided that when a seat rest is pivoted onto the seat portion, the locking tongue is unintentionally pierced into the seat portion or into the seat rest. This avoids any damage to the automobile seat by the seat belt. In particular, it is possible to connect the seat belt to the automobile seat preferably undetachably. It is thereby not necessary to release the seat belt from the automobile seat and roll it up in the area of the vehicle roof lining. The handling is thereby significantly simplified so that as a result of the reduced effort to make the seat belt ready for use again, the seat belt is more likely to be used by a vehicle occupant. This leads to an increased acceptance for the use of the seat belt and therefore to a lower risk of injury.

BRIEF DESCRIPTION OF THE DRAWINGS

The present invention will hereinafter be described in conjunction with the following drawing FIGURE, which shows a schematic perspective view of a seat belt according to an embodiment of the invention.

DETAILED DESCRIPTION

The following detailed description is merely exemplary in nature and is not intended to limit application and uses. Furthermore, there is no intention to be bound by any theory presented in the preceding background or summary or the following detailed description.

As discussed above, an automobile seat 100 is provided, in particular for a third row of seats of a passenger car, for example, SUV or VAN, comprising a seat portion and a seat rest pivotably connected to the seat portion, wherein the seat rest is pivotable from an upright position via a pivoting region until it rests flat on a seat surface of the seat portion, wherein a seat belt is disposed between the seat portion and the seat rest in the pivoting region of the seat rest, wherein the seat belt can be configured and further developed as described previously. The seat belt 10 shown in FIG. 1 comprises a webbing 12 to which a locking tongue 16 is movably connected in a longitudinal direction 14. A retaining device 20 is sewn to the webbing 12 over only a single upper side 21 of the webbing 12 via two fastening points 18 running in the longitudinal direction 14. The retaining device 20 is not designed in one piece with the webbing 12 but is provided as a separate component to the webbing 12.

In the exemplary embodiment shown, the retaining device is formed by a double-layer textile strap material 22 over the entire extension in the longitudinal direction 14 and transverse to the longitudinal direction 14. With the webbing 12 the strap material 22 forms an insertion opening 24 for the insertion of a metal locking element 26 of the locking tongue 16. Formed by the strap material 22 and the webbing 12 opposite the insertion opening 24 is an outlet opening 28, from which the locking element 26 can or also cannot project. The double-layer configuration of the strap material 22 is achieved by folding over the strap material 22 so that a rounded foldover edge 30 pointing in the direction opposite to the insertion direction of the locking tongue 16 is obtained, which facilitates threading of the locking element 26 of the locking tongue 16 into the insertion opening 24.

While at least one exemplary embodiment has been presented in the foregoing summary and detailed description, it should be appreciated that a vast number of variations exist. It should also be appreciated that the exemplary embodiment or exemplary embodiments are only examples, and are not intended to limit the scope, applicability, or configuration in any way. Rather, the foregoing summary and detailed description will provide those skilled in the art with a convenient road map for implementing an exemplary embodiment, it being understood that various changes may be made in the function and arrangement of elements described in an exemplary embodiment without departing from the scope as set forth in the appended claims and their legal equivalents.

What is claimed is:

1. A seat belt for protection of a vehicle occupant of an automobile, comprising:
   a webbing configured to restrain the vehicle occupant;
   a locking tongue movably connected to the webbing in a longitudinal direction of the webbing and configured to lock with a belt lock; and
   a textile retaining device immovably connected to the webbing having an insertion opening for at least partial receipt of the locking tongue,
   wherein the textile retaining device forms an outlet opening opposite the insertion opening, and wherein the textile retaining device is a separate part to the webbing,
   wherein the textile retaining device comprises a strap material folded over in a double layer to form a foldover edge, and
   wherein the foldover edge is oppositely directed to a direction of insertion of the locking tongue in the textile retaining device.

2. The seat belt according to claim 1, wherein a double-layer region of the strap material runs over a large proportion of an extension of the textile retaining device in the longitudinal direction of the webbing.

3. The seat belt according to claim 2, wherein the double-layer region of the strap material runs substantially over an entire extension of the textile retaining device in the longitudinal direction of the webbing.

4. The seat belt according to claim 2, wherein the double-layer region of the strap material runs over the large proportion of the extension of the textile retaining device transverse to the longitudinal direction of the webbing.

5. The seat belt according to claim 4, wherein the double-layer region of the strap material runs substantially over an entire extension of the textile retaining device transverse to the longitudinal direction of the webbing.

6. The seat belt according to claim 1, wherein in an inserted state of the locking tongue in the textile retaining device, the locking tongue is configured to nestle against the webbing and the strap material.

7. The seat belt according to claim 1, wherein the textile retaining device is connected to the webbing on only one upper side of the webbing.

8. The seat belt according to claim 1, wherein the textile retaining device is connected to the webbing with only two fastening points running in the longitudinal direction.

9. The seat belt according to claim 6, wherein the textile retaining device is sewn to the webbing at the only two fastening points with fastening seams.

10. An automobile seat, comprising:
a seat portion; and
a seat rest pivotably connected to the seat portion, the seat rest pivotable from an upright position via a pivoting region until resting flat on a seat surface of the seat portion;
a seat belt disposed between the seat portion and the seat rest in the pivoting region of the seat rest; the seat belt comprising:
a webbing configured to restrain an occupant;
a locking tongue movably connected to the webbing in a longitudinal direction of the webbing and configured to lock with a belt lock; and
a textile retaining device immovably connected to the webbing having an insertion opening for at least partial receipt of the locking tongue,
wherein the textile retaining device forms an outlet opening opposite the insertion opening, and wherein the textile retaining device is a separate part to the webbing,
wherein the textile retaining device comprises a strap material folded over in a double layer to form a foldover edge, and
wherein the foldover edge is oppositely directed to a direction of insertion of the locking tongue in the textile retaining device.

11. The automobile seat according to claim 10, wherein a double-layer region of the strap material runs over a large proportion of an extension of the textile retaining device in the longitudinal direction of the webbing.

12. The automobile seat according to claim 11, wherein the double-layer region of the strap material runs substantially over an entire extension of the textile retaining device in the longitudinal direction of the webbing.

13. The automobile seat according to claim 11, wherein the double-layer region of the strap material runs over the large proportion of the extension of the textile retaining device transverse to the longitudinal direction of the webbing.

14. The automobile seat according to claim 13, wherein the double-layer region of the strap material runs substantially over an entire extension of the textile retaining device transverse to the longitudinal direction of the webbing.

15. The automobile seat according to claim 10, wherein in an inserted state of the locking tongue in the textile retaining device, the locking tongue is configured to nestle against the webbing and the strap material.

\* \* \* \* \*